United States Patent Office 2,759,787
Patented Aug. 21, 1956

2,759,787

CELLULOSE CITRATES AND THEIR PREPARATION

George P. Touey and John E. Kiefer, Kingsport, Tenn., assignors to Eastman Kodak Company, Rochester, N. Y., a corporation of New Jersey No Drawing. Application May 15, 1953,
Serial No. 355,416

8 Claims. (Cl. 8—120)

This invention relates to water insoluble cellulose citrates and the process by which they are prepared which comprises heating cellulose with citric acid under dry conditions.

Cellulose esters containing free and reactive carboxyl groups and their salts are well known in the art. Some of these esters such as cellulose acetate phthalate are produced by treating cellulose or a cellulose derivative such as cellulose acetate with a dibasic acid anhydride in pyridine or some other organic solvent. The products which are obtained are acid esters of the cellulose wherein one carboxyl group of the dicarboxylic acid is bound to the cellulose by means of an ester linkage while the other carboxyl group remains free. Such products are usually soluble in organic solvents and though in acid form they are insoluble in water their alkali metal salts are soluble in water or aqueous liquids. Because of their solubility characteristics these cellulose esters are of little use as absorbents or ion exchange agents.

One object of our invention is to provide a new chemical compound. Another object of our invention is to provide organic acid esters of cellulose containing free carboxyl groups which are insoluble in organic solvents and in aqueous solutions either as the acid esters or in the form of their salts. A further object of our invention is to provide a new type of cellulose cationic exchange agent or absorbent which has substantially the same porosity and general characteristics as cellulose itself. A still further object of our invention is to provide a method for preparing cellulose compounds having free carboxyl groups therein by reacting cellulose directly with citric acid. Other objects of our invention will appear herein.

We have found that new types of insoluble cellulose acid esters may be prepared by a process in which cellulose, citric acid and water or a lower alcohol are employed as the starting materials. We have found that these esters which are cellulose acid citrates have free and reactive carboxyl groups but yet are insoluble in all the common solvents and are insoluble in water whether neutral, acid or alkaline. We have found that these compounds are readily prepared by impregnating the cellulose with an aqueous or alcoholic solution of citric acid, drying the resultant mass to remove substantially all of the water or alcohol therefrom and then subjecting the mass to an elevated temperature for a time depending upon the conditions employed and the proportion of citric acid groups which it is desired to introduce. We have found that by reacting upon cellulose in this manner products are obtained which are as porous as the original cellulose and are ideally suited as absorbents for very large molecules such as hormones and antibiotics.

In the preparation of cellulose acid citrates in accordance with our invention the cellulose in a fibrous or comminuted form such as wood pulp, cotton linters, cellulose powder, fabric or the like, is submerged in an aqueous or alcoholic solution of citric acid for a period of time sufficient to thoroughly impregnate the cellulose. This period may range from a few seconds to several hours depending upon the form of the cellulose which is employed. For instance, fibreboard or pulp board would require a much longer period for impregnation than ordinary cotton or cellulose powder. This impregnation may be facilitated by carrying out the operation at a temperature within the range 25–100° C. After the cellulose is thoroughly impregnated with the citric acid solution it may be then removed from the aqueous acid and pressed, filtered, or centrifuged to a weight which corresponds to 0.1–10 parts of citric acid for each part of dry cellulose. The cellulose is then dried at or near room temperature such as by passing air by suction through the cellulose or in any other manner particularly one in which a current of air or dry gas is used. When the moisture content of the mass is reduced such as to 15% or less, the mass is heated at a temperature within the range of 60–180° C. for a time sufficient to give the desired degree of esterification. This time may range from several minutes to several hours depending to a considerable extent on the temperature employed and to a lesser extent on the proportion of citric acid present in the cellulose. Thereupon the heated mixture is washed with water until all of the unreacted citric acid is removed and the resulting product is an acid cellulose citrate having one or more carboxyl groups of the citric acid joined to one or more hydroxyl groups of the cellulose by an ester linkage.

The cellulose material which is to be esterified in accordance with our invention may be in a variety of forms such as a powder, a fibrous mass, a pressed sheet, a sponge, or a fabric. If the resulting product is to be employed as an absorbent or ion exchange agent it is desirable that the powder form be employed.

In preparing cellulose citrates in accordance with our invention the esterification of the cellulose takes place when the water (or alcohol) is substantially all removed. The mixture of cellulose, water (or ethyl or methyl alcohol) and citric acid obtained in the beginning can for instance be dried in air at room temperature and then passed into a drying oven for the actual esterification step or it can be dried and esterified in a drying oven in one operation. In the latter case sufficient time should be allowed for both driving off the moisture from the mass and the actual esterification.

In esterifying the cellulose the minimum amount of acid present should be at least 0.085 mol of citric acid for each mol unit of cellulose. In actual weight ratio this corresponds to approximately 0.1 part of citric acid for each part of cellulose. Although there is no arbitrary maximum for the citric acid which can be employed it has been found that there is little advantage gained when the acid content in the mixture of cellulose and citric acid is more than 1.5 parts citric acid to one part of cellulose. For example, cellulose citrates have been obtained having an average degree of esterifications no higher than two citric acid groups per five anhydroglucose units (15.5% COOH) when one part of cellulose and either 1 or 3 parts of citric acid were used and heated for 24 hours at 110° C.

The length of time of heating required to obtain a maximum degree of esterification will depend upon the temperature selected from the range of 60–180° C. At 60° C. several days may be required to obtain a degree of esterification of one citric acid radical for 4 anhydroglucose units when one part of cellulose and one part of citric acid is employed. If however a temperature of 100–110° C. is used the time required for the same degree of esterification is ordinarily between 14 and 18 hours, while at 150° C. one hour will ordinarily be sufficient. If temperatures above 140° C. are employed some of the citric acid might be converted to aconitic acid which would also esterify in the manner described for the citric acid. If this should happen the resulting product nevertheless exhibits the desirable properties stated above for the cellulose citrate. The preferred range of temperature at which to prepare products in accordance with our invention is 90–115° C. When temperatures within this range are employed with quantities of citric acid below the ratio of 1 part of citric acid to 3 parts of cellulose approximately 70% of the acid combines with the cellulose after a 16 hour heating period to give a product containing 15–20% combined citric acid and a free carboxyl content within the range of 6–9%. Shorter heating periods will give lower degrees of esterification. At temperatures within the range of 90–115° C. and employing quantities of citric acid equal to 1 part of acid to 1–3 parts of cellulose, approximately 35–70% of the acid combines with the cellulose within a 16 hour heating period to give a product containing 15–30% combined citric acid and having a free carboxyl content within the range of 6–14%. Longer heating periods under these conditions do not result in any appreciable increase in the degree of esterification. At temperatures of 125–150° C. and employing quantities of citric acid equal to 1 part acid and 1–3 parts cellulose, approximately 35–70% of the acid combines with the cellulose within 1–6 hours heating period to give a product containing 15–30% combined citric acid and having a free carboxyl content within the range of 6–14%. Longer heating periods at these elevated temperatures (as above 125° C.) are to be avoided as this prolonged heating may tend to degrade the cellulose employed as the starting material.

Repeated experiments have indicated that the upper limit for the amount of citric acid in the product is approximately 33% which corresponds to a free carboxyl content of 15.5% and is obtained only under the most favorable conditions. Ordinarily where the cellulose citrates are to be employed as absorbents or ion exchange agents it is desirable to have free carboxyl values therein of at least 8%, 8–12% being very practical limits; however, cellulose citrates with a less degree of esterification exhibit absorbing properties and products may be obtained by the procedure described herein having a combined citric acid content from 2.35% up which corresponds to cellulose esters with approximately 1% or more of free carboxyl groups.

The cellulose acid citrates obtained in accordance with our invention are capable of removing various materials particularly hormones from aqueous solution. For such purposes this material is superior to the usual resin type ion exchange agents. For instance in the case of removing the hormone ACTH from solution the products in accordance with our invention have shown special utility. The cellulose citrates in accordance with our invention exhibit maximum utility in their use for extraction from aqueous solution of the different types of materials which have an affinity for acid groups. These materials can then be removed from the cellulose citrate material by treatment with dilute mineral acid.

In addition to their value as absorbents for high molecular weight materials in accordance with our invention they have other uses. For instance, a cloth of cotton or viscose to which a combined citric acid content has been imparted may be treated with urea-formaldehyde or melamine formaldehyde resins whereby crease resistance or dye resistance may be imparted thereto. Also these materials may be employed for mildew resistant or water repellent fabrics by treatment of the fabrics with reagents having an affinity for acid groups such as copper salts or high molecular weight amines. There is one precaution to be observed in the use of the cellulose citrates. A treatment thereof with an excess of a very strong base may saponify the ester linkages of the compounds and destroy their effectiveness; however, as the salts of the cellulose citrates are not water soluble they are suitable for use under mildly alkaline aqueous conditions without dissolving or disintegration. The following examples illustrate the preparation of cellulose citrates in accordance with our invention:

Example 1

500 parts of ground cellulose powder were slurried for 10 minutes at 25° C. in a solution of 1500 parts of citric acid and 2858 parts of water. The mass was filtered to a weight of 2108 parts containing 500 parts of cellulose, 550 parts of citric acid and 1058 parts of water. The cellulose was dried in a forced air dryer to a moisture content of 15% and heated in a drying oven at a temperature of 105° C. for 12 hours. The moisture was substantially all driven off and the cellulose reacted with the citric acid. The mass obtained was washed in warm distilled water until the washings were neutral and was then dried in a forced air dryer at 50° C. The product obtained was a white powder insoluble in water, aqueous sodium bicarbonate and the common organic solvents. It had a free carboxyl content of 15%. The material thus obtained is useful as an absorbent.

Example 2

10 parts of cellulose acid citrate as prepared in the preceding example was slurried for 10 minutes in 200 parts of water containing 0.5% sodium bicarbonate and filtered. Titration of the filtrate indicated the absence of the sodium bicarbonate. The residue was regenerated by treating the cellulose citrate with an excess of aqueous 5% hydrochloric acid. The cellulose citrate was then washed in demineralized water until free of HCl and upon drying was found to have a free carboxyl content of 14.9%.

Example 3

10 parts of cellulose acid citrate as prepared in Example 1 was slurried for 10 minutes in 200 parts of water containing 0.5% diethanol amine. The mixture was filtered. The filtrate was found to be free of amine. A 95% recovery of the amine was obtained by washing the cellulose citrate with dilute aqueous hydrochloric acid and isolating the amine hydrochloride from the washings. The cellulose acid citrate was washed with demineralized water and was found to have a carboxyl content on the same order as the original material.

Example 4

50 parts of ground cellulose powder was slurried for 10 minutes at 25° C. in a solution of 75 parts of citric acid and 285 parts of water. The mixture was filtered and pressed to a weight of 170 parts made up of 50 parts of cellulose, 25 parts of citric acid and 95 parts of water. The mixture was dried at room temperature for 24 hours to 18% moisture content. It was heated at 110° C. for 7 hours whereby the moisture was completely removed and the citric acid reacted with the cellulose. The mass was washed with mineral free water until free of uncombined citric acid and was dried in the air at room temperature. The product obtained had a free carboxyl content of 9.8% and was insoluble in water, dilute sodium bicarbonate, and in the common organic solvents. The cellulose acid citrate was refluxed in demineralized water for 30 minutes, filtered, dried, and reanalyzed for free carboxyl content. The value obtained (9.7%) indicates the citric acid groups were chemically bound to the cellulose.

Example 5

10 parts of surgical gauze was submerged in boiling water for 10 minutes whereupon it was placed in a 1000 parts of 30% aqueous citric acid maintained at 37° C. The gauze was allowed to remain in the acid for 30 minutes and was then removed and pressed to a weight corresponding to 1 part of gauze and 1 part of citric acid. The excess water was removed in a forced air dryer at 50° C. and the gauze was then heated for 12 hours at 85° C. The moisture was substantially completely removed from the gauze and the citric acid therein reacted with the cellulose. The gauze was washed and dried and was found to have a free carboxyl content of 9.1%. It was unchanged in physical appearance from the starting material. The ammonium salt of this product was prepared by treating the gauze with an excess of dilute aqueous ammonium chloride solution and then washing in demineralized water until the washings indicated the absence of chloride. The nitrogen content of the gauze was 2.68% as contrasted to a theoretical nitrogen content of 2.76%.

We claim:

1. Cellulose acid citrate having a free carboxyl content of 1–15.5% which ester is characterized by being insoluble both in the form of the free acid and of its salt in water organic solvents and aqueous alkalies.

2. Cellulose acid citrate having a free carboxyl content of 8–12% which ester is characterized by being insoluble both in the form of the free acid and of its salt in water organic solvents and aqueous alkalies.

3. A method of preparing cellulose acid citrates insoluble in water and organic solvents in the form of both the free acid and its salt which comprises heating an intimate mixture of cellulose and citric acid at 60–180° C. for 1–24 hours.

4. A method of preparing cellulose acid citrates insoluble in water and organic solvents in the form of both the free acid and its salt which comprises impregnating 1 part of cellulose with 0.1–3 parts of citric acid in the form of its aqueous solution, drying the impregnated cellulose and heating the dried combination of cellulose and citric acid for 1–24 hours at a temperature within the range of 60–180° C.

5. A method of preparing cellulose acid citrates insoluble in water and organic solvents in the form of both the free acid and its salt which comprises immersing cellulose in a dilute solution of citric acid and removing the cellulose from the liquid so as to leave thereon 1–3 parts of citric acid per part of cellulose, drying the cellulose and subjecting it to a temperature within the range of 60–180° C. for 1–24 hours.

6. A method of preparing cellulose acid citrates insoluble in water and organic solvents in the form of both the free acid and its salt which comprises saturating cellulose with an aqueous solution of citric acid and then removing the excess liquid therefrom so as to leave on the cellulose 1–3 parts of citric acid per part of cellulose, drying the cellulose and heating at a temperature within the range of 90–150° C. for a sufficient time to cause a substantial proportion of the citric acid to combine with the cellulose.

7. A method of preparing cellulose acid citrates insoluble in water and organic solvents in the form of both the free acid and its salt which comprises heating a dry intimate mixture of cellulose and citric acid at a temperature of approximately 110° C. for a sufficient time to cause a substantial proportion of the citric acid to combine with the cellulose.

8. A method of preparing cellulose acid citrates insoluble in water and organic solvents in the form of both the free acid and its salt which comprises impregnating cellulose in fabric form with citric acid and subjecting the fabric when dry to a temperature within the range of 90–150° C. for a sufficient time to cause a substantial proportion of the citric acid to combine with the cellulose fabric.

References Cited in the file of this patent

UNITED STATES PATENTS 2,146,755   McNally _____ Feb. 14, 1939

FOREIGN PATENTS 534,894   Great Britain _____ Apr. 25, 1941

OTHER REFERENCES

"Cellulose and Cellulose Derivatives," (E. Ott) Interscience Publishers, Inc., New York, New York (1943), (page 1144 relied upon).